J. J. HENNESSEY.
SIDE BEARING FOR RAILWAY CARS.
APPLICATION FILED SEPT. 16, 1915.
1,169,820.
Patented Feb. 1, 1916.
2 SHEETS—SHEET 1.
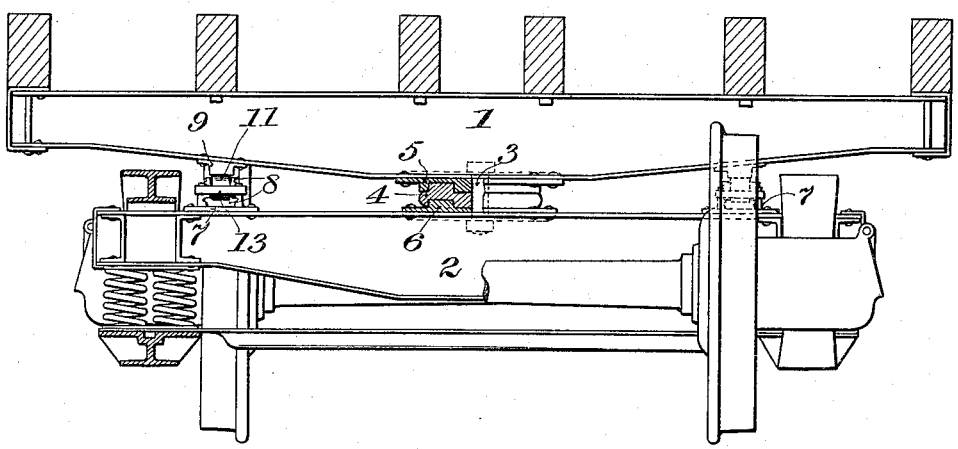
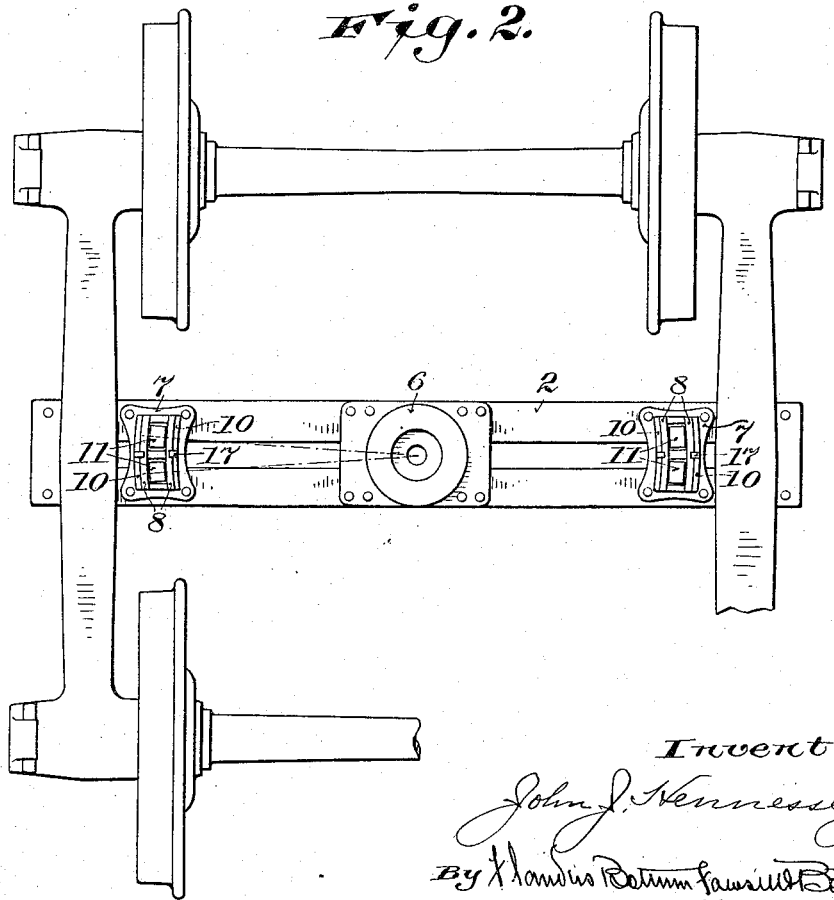
Inventor:
John J. Hennessey.

J. J. HENNESSEY.
SIDE BEARING FOR RAILWAY CARS.
APPLICATION FILED SEPT. 16, 1915.
1,169,820.
Patented Feb. 1, 1916.
2 SHEETS—SHEET 2.
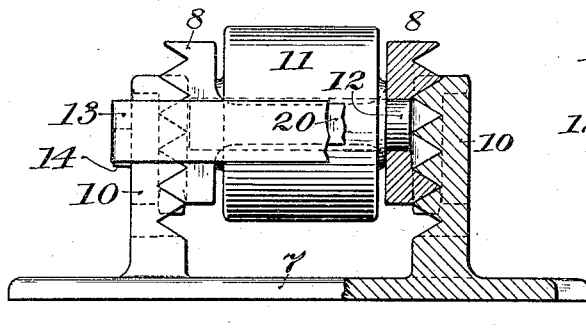
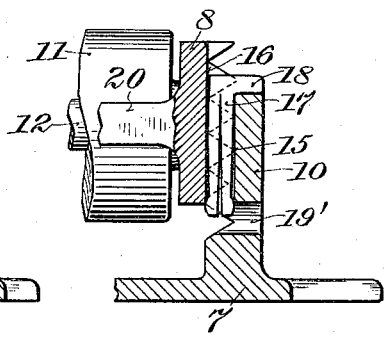
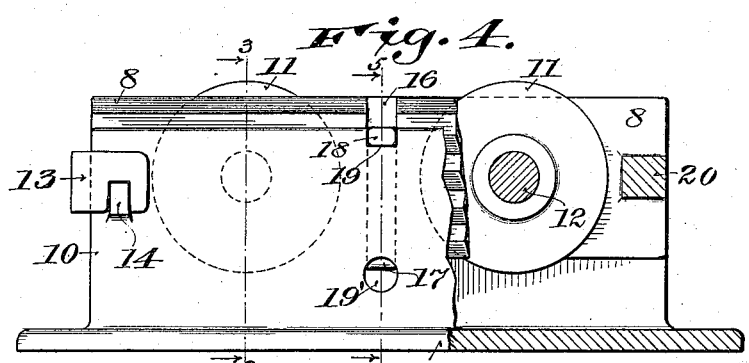
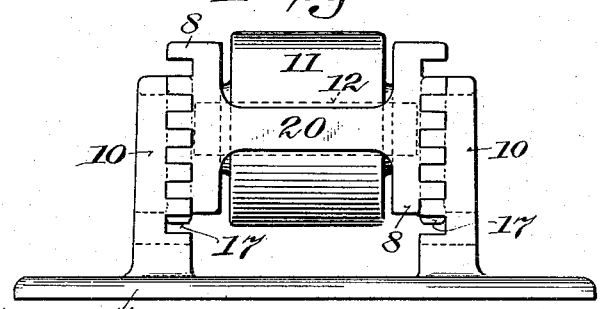
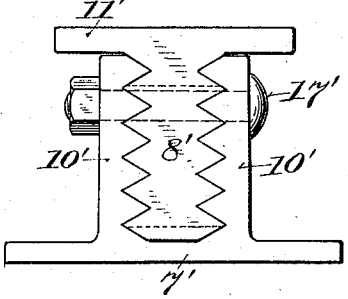
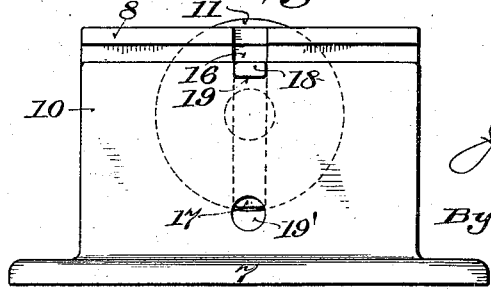
Inventor
John J. Hennessey,
By Hondro Bolton Fawcett & Bolton
Attorneys.

UNITED STATES PATENT OFFICE.

JOHN J. HENNESSEY, OF MILWAUKEE, WISCONSIN.

SIDE BEARING FOR RAILWAY-CARS.

1,169,820. Specification of Letters Patent. Patented Feb. 1, 1916.

Application filed September 16, 1915. Serial No. 50,930.

*To all whom it may concern:*

Be it known that I, JOHN J. HENNESSEY, a citizen of the United States, residing at Milwaukee, in the county of Milwaukee and State of Wisconsin, have invented certain new and useful Improvements in Side Bearings for Railway-Cars, of which the following is a specification, reference being had to the accompanying drawing, forming a part thereof.

The main objects of this invention are to facilitate adjustment of the side bearings to correspond with the vertical adjustment of the center bearings in order to maintain the car bodies at the prescribed elevation above their trucks or the track on which they run, and generally to improve the construction and operation of bearings of this class.

It consists in the construction, arrangement and combination of parts as hereinafter particularly described and pointed out in the claims.

In the accompanying drawing like characters designate the same parts in the several figures.

Figure 1 is a general view partly in elevation and partly in vertical cross section, of a car truck and body bolster to which side bearings embodying the invention are applied; Fig. 2 is a plan view of the truck and side bearings, without the body bolster; Fig. 3 is an enlarged end elevation partly in vertical section on the line 3—3, Fig. 4, of one of the side bearings shown in Figs. 1 and 2; Fig. 4 is a side elevation of the bearing shown in Fig. 3, portions thereof being broken away; Fig. 5 is a partial vertical cross section on the line 5—5, Fig. 4; Fig. 6 is an end elevation of a modified form of the bearing; Fig. 7 is a side elevation thereof; and Fig. 8 is an end elevation of another modified form of the bearing.

Referring to Figs. 1 and 2, 1 designates a car body bolster and 2 a truck bolster, which are pivotally connected with each other in the usual or any suitable manner by a king bolt or center pin 3, and center bearing. Preferably the center bearing is one having special provision to facilitate vertical adjustment of the body bolster relative to the truck bolster, such for example, as the adjustable center bearing for which Letters Patent of the United States No. 1,009,306 was issued to me November 21, 1911, and which as shown in Fig. 1, comprises three plates formed with interfitting circular bosses and grooves or channels concentric with the center pin, for relieving said pin of undue strain and wear. The intermediate or filling plate 4, having faces which are counterparts of the opposing and contacting faces of the plates 5 and 6, which are bolted or riveted to the body bolster 1 and the truck bolster 2 respectively, may be made of different thicknesses, or a plurality of such plates may be used to effect the desired adjustment.

The side bearing constituting the present invention, comprises a base member 7, which may be fastened either to the upper side of the truck bolster as shown, or to the under side of the body bolster, a bearing member 8, supported by the base member and adjustable vertically relative thereto, and a bearing plate or block 9, attached to the other bolster in position to coöperate with the bearing member 8.

As shown in Figs. 3, 4 and 5, the base member 7 is formed with a plate or flange for bolting or riveting it to the bolster, and with two parallel vertical walls 10, which are horizontally tongued and grooved on their opposing inner sides. The vertically adjustable bearing member 8 is formed with correspondingly tongued and grooved sides, which are removably fitted to and between the tongued and grooved walls 10 of the base member. The interfitting tongues and grooves may be of any suitable shape in cross section. As shown in Figs. 3, 4 and 5 they are of V-shape, which is strong and easily made. For large or heavy cars, the bearing members are preferably provided with anti-friction rollers 11, mounted in recesses or openings therein on cross pins or axles 12, and projecting above said members to coöperate with the bearing plates or blocks 9, as shown in Fig. 1. Each bearing may be provided with one or more of these rollers, the bearing shown in Figs. 3, 4 and 5 having two.

The tongued and grooved walls of the base members 7 and sides of the bearing members 8, are preferably curved, as shown in Fig. 2, concentrically with the king bolt or center pin 3, and the axes of the rollers 11 are arranged radially with relation to the king bolt or center pin. To provide for a finer adjustment than is afforded by simply raising or lowering the bearing member 8 relative to the base member 7, the bearing member is made reversible, and the tongues and grooves are offset one-fourth of the pitch of the tongues, or of the distance between centers of adjoining tongues, from the horizontal center of the member, so that when the member is inverted it may be raised or lowered relative to the base member one-half the distance between centers of adjoining tongues or grooves. The roller or rollers 11 with which a reversible bearing member is provided, are made to project both above and below the member, so that when the member is inverted, the roller will properly coöperate with the bearing plate or block 9, above or below it, according to whether it is attached to the body bolster 1, as shown, or to the truck bolster 2. As shown by the drawing, the base member is open at both ends between the walls 10, and the bearing member 8 may be inserted therein or withdrawn therefrom at either end. To prevent the spreading of the walls 10 when subjected to a heavy load, particularly when V-shaped tongues and grooves are used, the base member may be provided at one or both ends with a removable cross tie or yoke 13, made of angular form, to embrace the outer sides of said walls, and notched to engage with lugs 14 thereon, for holding it in place. For this purpose the walls 10 may be connected at one end by a cross wall or tie formed integrally therewith, and at the other end may or may not be provided with a removable tie or yoke 13.

To securely fasten and hold the bearing member 8 in place and at the same time permit of its removal from the base member 7 for the purpose of adjustment or repair, the opposing tongued and grooved walls of said members are formed on one or both sides thereof, with corresponding vertical grooves or key ways 15 and 16, in which a key 17 is fitted, as shown in Fig. 5. This key is formed with an angular or laterally projecting head 18, which fits into a notch 19 in the wall 10 at the upper end of the groove 15. To prevent the key from accidental displacement or jarring loose, it is preferably made of spring steel or metal, and split or spread as shown in Fig. 5, its body being tapered and its lower end enlarged so as to be held in place by frictional engagement with the walls of the opening or grooves 15 and 16, in which it is inserted. To facilitate the removal of the key, the wall 10 is formed with a hole 19', through which a pin or the like can be inserted into the groove 15 below the lower end of the key, to pry it upwardly. The sides of the bearing member 8, when separated to receive a roller or rollers 11 between them, are connected at the ends by cross ties 20, which may be formed integrally therewith, and when the bearing is provided with more than one roller, the sides of the bearing member may be connected by a like or similar cross tie or piece at one or more intermediate points between the rollers, as shown in Fig. 5. The bearing may be made shorter and lighter, and provided with a single roller 11, as shown in Figs. 6 and 7. The interfitting tongues and grooves in the sides of the base and bearing members for the adjustment of the bearing member may be of square or rectangular shape, as shown in Fig. 6.

A simpler, lighter and cheaper vertically adjustable side bearing embodying some of the essential features and advantages of the bearings hereinbefore described and illustrated in other figures of the drawing, may be constructed substantially as shown in Fig. 8, without the anti-friction roller or rollers, and without the reversible feature of the bearing member embodied in the other forms. In this form of the device the vertical walls 10' of the base member 7' may be made closer to each other, and the bearing member 8' formed with a solid web having tongued and grooved sides removably fitting between the correspondingly tongued and grooved walls of the base member. The tongues and grooves, as in the case of the other forms of the bearing, may be made of any suitable shape in cross section. The bearing member 8' is formed at the top with an extended bearing plate 11' having a substantially flat surface for direct contact with the bearing plate or block 9. The bearing member may be fastened and held in place in the base member by a bolt 17' passing through registering holes in the walls 10' of the base member and the tongued and grooved web of the bearing member, the hole in the web of the bearing member being vertically slotted or elongated to permit of vertical adjustment of said member.

With any of the several forms of the bearing, vertical adjustment is effected by removing the bearing member from the base member and reinserting it therein in a different position, to correspond with the adjustment of the center bearing. Without reversing or inverting the bearing member, the smallest adjustment which can be made, corresponds with the pitch of the interfitting tongues and grooves of the base and bearing members, or the distance between centers of adjoining tongues or grooves.

With the form shown in Figs. 1 to 5 inclusive, or the form shown in Figs. 6 and 7, by inverting the bearing member, the extent of its vertical adjustment may be divided, or reduced to half the pitch of the tongues or distance between centers of adjoining tongues.

Either of the reversible forms of the bearing shown in Figs. 1 to 5 inclusive, or in Figs. 6 and 7 may be made without rollers 11. The bearing members 8 may in that case be provided with flat or plain interchangeable bearing faces on their upper and lower sides, substantially like that shown in Fig. 8.

Various modifications other than those specifically mentioned may be made in the construction and arrangement of parts, without departure from the principle and scope of the invention as defined in the following claims.

I claim:

1. In a side bearing for railway cars the combination of a base member having horizontally tongued and grooved vertical walls and a vertically adjustable bearing member having correspondingly tongued and grooved sides removably fitting the tongued and grooved walls of the base member.

2. In a side bearing for railway cars the combination of a base member having opposing horizontally tongued and grooved vertical walls and a reversible bearing member having correspondingly tongued and grooved sides removably fitting the tongued and grooved walls of the base member, the tongues and grooves of the bearing member being unequally spaced relative to its bearings.

3. In a side bearing for railway cars the combination with a bolster of a base member having opposing horizontally tongued and grooved vertical walls curved concentrically with the center of the bolster, and a bearing member having correspondingly tongued and grooved and curved sides removably fitting the tongued and grooved walls of the base member and vertically adjustable relative thereto.

4. In a side bearing for railway cars the combination of a base member having opposing horizontally tongued and grooved vertical walls, a vertically adjustable bearing member having correspondingly tongued and grooved sides removably fitting the tongued and grooved walls of the base member, and means for locking the bearing member in adjusted position in the base member.

5. In a side bearing for railway cars the combination of a base member having horizontally tongued and grooved vertical walls, a bearing member having correspondingly tongued and grooved sides removably fitting the tongued and grooved walls of the base member, said members being formed in their tongued and grooved faces with vertical key grooves, and a key fitting the registering vertical grooves and adapted to lock the bearing member in place in the base member.

6. In a side bearing for railway cars the combination of a base member having horizontally tongued and grooved vertical walls, a bearing member having correspondingly tongued and grooved sides removably fitting between the tongued and grooved walls of the base member, said members being formed with vertical key grooves intersecting their interfitting tongued and grooved faces, and a split spring key fitting into said vertical grooves when brought into register with each other to hold the bearing member in place relative to the base member.

7. In a side bearing for railway cars the combination of a base member having horizontally tongued and grooved vertical walls and a bearing member having correspondingly tongued and grooved walls, and a roller mounted in said bearing member and projecting above the same.

8. In a side bearing for railway cars the combination of a base member having horizontally tongued and grooved vertical walls and means for attachment to a bolster, a reversible bearing member having correspondingly tongued and grooved sides fitting the tongued and grooved walls of the base member, and a roller mounted in the bearing member with its axis radial relative to the center of the bolster and passing midway between centers of adjoining tongues and grooves in the sides of the bearing member.

9. In a side bearing for railway cars the combination of a base member having vertical walls horizontally tongued and grooved, a bearing member having correspondingly tongued and grooved sides removably fitted between the walls of the base member, and a removable cross tie for connecting the walls of the base member and preventing the same from spreading.

In witness whereof I hereto affix my signature in presence of two witnesses.

JOHN J. HENNESSEY.

Witnesses:
 CHAS. L. GOSS,
 MARTIN H. RICE.